(12) United States Patent
Contreras

(10) Patent No.: US 11,363,407 B2
(45) Date of Patent: Jun. 14, 2022

(54) SYSTEMS AND METHODS FOR SECURE IN-PERSON DATING AND SOCIALIZING

(71) Applicant: ON LLC, Corona, CA (US)

(72) Inventor: Luis Contreras, Corona, CA (US)

(73) Assignee: ON LLC, Corona, CA (US)

( * ) Notice: Subject to any disclaimer, the term of this patent is extended or adjusted under 35 U.S.C. 154(b) by 100 days.

(21) Appl. No.: 17/079,636

(22) Filed: Oct. 26, 2020

(65) Prior Publication Data

US 2022/0132267 A1 Apr. 28, 2022

(51) Int. Cl.
| | | |
|---|---|---|
| *H04W 4/021* | (2018.01) | |
| *H04W 4/21* | (2018.01) | |
| *H04W 4/90* | (2018.01) | |
| *H04W 8/00* | (2009.01) | |
| *H04M 1/72421* | (2021.01) | |
| *H04M 1/72451* | (2021.01) | |
| *H04M 1/72457* | (2021.01) | |

(52) U.S. Cl.
CPC ....... *H04W 4/021* (2013.01); *H04M 1/72421* (2021.01); *H04M 1/72451* (2021.01); *H04M 1/72457* (2021.01); *H04W 4/21* (2018.02); *H04W 4/90* (2018.02); *H04W 8/005* (2013.01)

(58) Field of Classification Search
CPC ......... H04W 4/021; H04W 4/21; H04W 4/90; H04W 8/005; H04M 1/72421; H04M 1/72457; H04M 1/72451
See application file for complete search history.

(56) References Cited

U.S. PATENT DOCUMENTS

| | | | | |
|---|---|---|---|---|
| 9,924,315 | B1* | 3/2018 | Cornwall | H04W 4/022 |
| 10,757,672 | B1* | 8/2020 | Knas | H04W 8/005 |
| 2012/0157157 | A1* | 6/2012 | Chakra | H04M 1/72412 |
| | | | | 455/550.1 |
| 2013/0297690 | A1* | 11/2013 | Lucero | H04L 67/34 |
| | | | | 709/204 |

* cited by examiner

*Primary Examiner* — Farid Seyedvosoghi

(74) *Attorney, Agent, or Firm* — Ansari Katiraei LLP; Arman Katiraei; Sadiq Ansari

(57) ABSTRACT

Disclosed is a secure in-person dating and socializing platform. The platform may perform a check-in of a first user at a particular event based on messaging from a first device of the first user. The first device may receive messages from other devices of other users at the particular event that have previously checked-in to the particular event. Each message may provide a status for a different one of the other users. The first device may determine a location of each of the other devices based on signaling characteristics associated with receiving each message, may determine an area falling within a field-of-view of the first device camera, and may provide an augmented reality presentation of the camera feed with a visual indicator for the status of a second user at a particular location in the field-of-view that maps to the location of a second device of the second user.

20 Claims, 8 Drawing Sheets

US 11,363,407 B2

SYSTEMS AND METHODS FOR SECURE IN-PERSON DATING AND SOCIALIZING

BACKGROUND

Dating begins online now more than before. Popular dating services may present a profile with a picture and basic user information, and may determine a user's interest based on a simple swipe in one direction. If two users are presented with each other's picture and basic user information, and each user swipes in the same direction, the dating service may identify a match. In response to the match, the dating service may provide each user with the private contact information and/or private profile information of the matched user. In other words, a user's telephone number, email address, and/or other private user information may be exposed based on nothing more than what a user learns from a picture and a few sentences in another user's public profile, all of which can be falsified or manipulated. After matching two strangers and revealing their private information to one another, the dating service may leave the users to themselves and may not offer any safeguards for the engagement that may follow. Such an approach to dating and/or socializing raises serious user privacy and user safety concerns.

DETAILED DESCRIPTION OF PREFERRED EMBODIMENTS

The following detailed description refers to the accompanying drawings. The same reference numbers in different drawings may identify the same or similar elements.

Systems and methods, in accordance with the embodiments set forth herein, may provide a secure in-person dating and socializing platform. In particular, the systems and methods may leverage augmented reality, short-range device-to-device messaging, location tracking services, and/or other user mobile device services, structures, and/or functionality as part of a secure and safe dating platform that promotes and/or facilitates in-person engagement between users while preserving user privacy and providing multiple user safeguards to ensure safe interactions between strangers.

In some embodiments, the dating platform may preserve user privacy by providing each user control over when private information about the user is exposed to another user, and which other users the private information is exposed to. Accordingly, the dating platform may bring together interested users in a safe public setting without exposing their private information, may promote in-person interaction between the interested users again without exposing their private information, and may allow a user to disclose his/her private information (e.g., a telephone number, email address, and/or other contact information) to another user after having an in-person engagement with the other user and/or after verifying an actual interest between the users that cannot be faked with a fake profile picture or fake profile information.

In some embodiments, the dating platform safeguards may leverage the mobile device services to detect user behavior that may violate one or more safety protocols and/or to detect potentially unsafe interaction between users of the dating platform. In some such embodiments, the dating platform safeguards may summon assistance from emergency contacts, security personnel, authorities (e.g., police), and/or other third-parties when a safety protocol violation is detected. For instance, the dating platform may provide the location, identity, and/or information about a safeguarded user and/or other users that engaged with the safeguarded user or that left a designated safe location with the safeguarded user to the third-parties. In this manner, the dating platform may bring together interested users at an event in a safe public setting, and may ensure that the users remain safe upon leaving the event alone or with another dating platform user.

Figure 1:
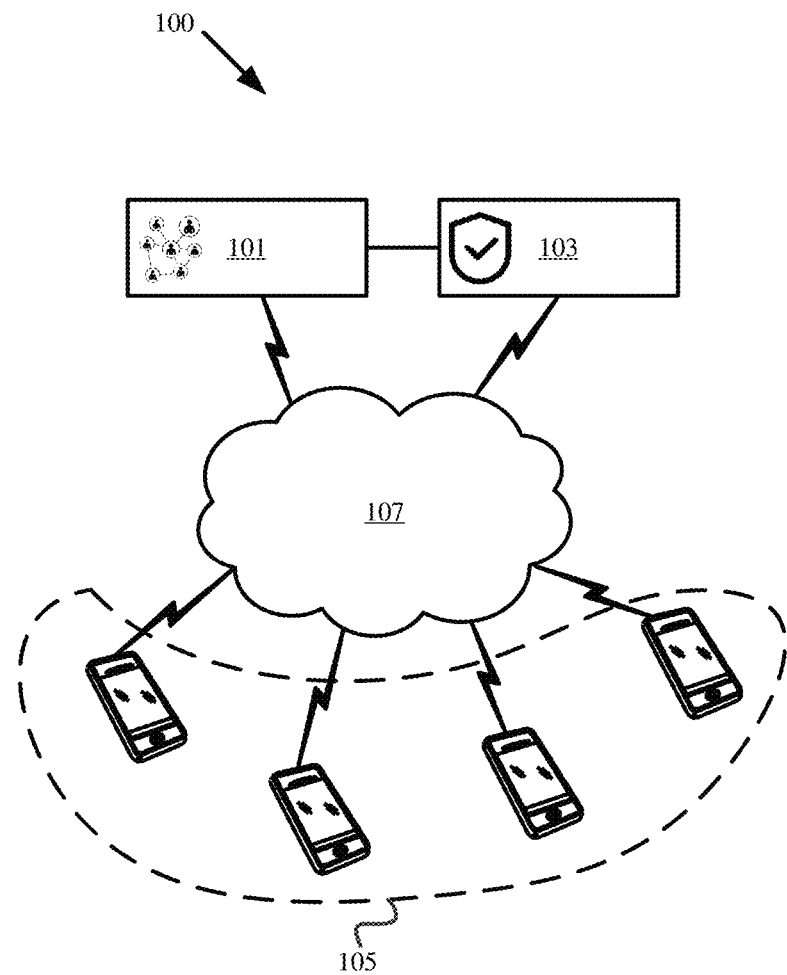
FIG. 1 illustrates example components of a dating platform in accordance with some embodiments presented herein.

FIG. 1 illustrates example components of dating platform 100 in accordance with some embodiments presented herein. As shown in FIG. 1, dating platform 100 may include controller 101, safeguard system 103, user devices 105, and wireless data network 107.

Controller 101 may include one or more devices for generating events, promoting engagement between users that have checked-in to a particular event, establishing links between interested users at the particular event, and/or disseminating private information of a particular user upon request by that particular user. The private information may include any information or data that may be used to directly contact the particular user and/or that discloses non-public identifying information about the particular user. For instance, a telephone number, name, email address, specific preferences, and/or other information may be classified as private information that is to remain confidential unless the particular user explicitly authorizes controller 101 to release of that information to another user. In contrast, public information may include any information that the particular user makes or designates to be publicly available and/or does not directly reveal the particular user's true identity. For instance, the public information may include an image or picture of the particular user, general interests, age, and/or other descriptive characteristics or preferences of the particular user. In some embodiments, controller 101 may store the private information and the public information of the particular user as part of the same user profile. The private information may be differentiated from the public information via different tags. In some embodiments, each user of dating platform 100 may create a profile upon registering with dating platform 100, and may provide the private and/or public information as part of creating the profile.

Safeguard system 103 may include one or more devices for safeguarding users that participate in the dating platform events created by controller 101. In particular, safeguard system 103 may enforce a set of user customizable safety protocols to provide the participating user with different protections while at an event and/or after leaving an event alone or with another participating user. Safeguard system 103 may have access to the user profiles stored by controller 101, the check-in data created by controller 101 for users participating in different events, the links that are established between different interested users while at an event, and/or user device services.

In some embodiments, safeguard system 103 may be integrated as part of controller 101, and/or may operate on distinct hardware from controller 101. In some embodiments, a different instance of controller 101 and/or safeguard system 103 may be instantiated and run for different dating platform events that take place in different locations. For instance, a first instance of controller 101 and safeguard system 103 may promote user engagement and safeguard users at a first dating event in a first city, and a second instance of controller 101 and safeguard system 103 may promote user engagement and safeguard users at a different second dating event taking place in a different second city at the same time as the first dating event.

User devices 105 may include portable or mobile network-connected devices or user equipment ("UEs") that may be on the person of each user (e.g., carried by each user). User devices 105 may include smartphones, mobile telephones, smartwatches, and/or other wearable devices with wireless network connectivity. To function as part of the dating platform, each user device 105 may be registered with dating platform 100 during user registration. Registering user device 105 may include installing a particular dating platform application from which controller 101 and/or safeguard system 103 may access different sensors (e.g., a Global Positioning System ("GPS") sensor), radios (e.g., Bluetooth and WiFi radios), and/or services (e.g., location tracking services, messaging services, calling services, etc.) of user devices 105, obtain information from user devices 105, and/or activate and/or deactivate the accessible sensors, radios, and/or other functionality of user devices 105 via wireless data network 107.

In some embodiments, user devices 105 may support long-range and short-range wireless radios. The long-range wireless radios may be used for communicating with controller 101 and/or safeguard system 103 over a first network, and the short-range wireless radios may be used for device-to-device communication and/or peer-to-peer communication between user devices 105 of different users that are participating in the same event and/or are at the same location.

Wireless data network 107 may include one or more of a long-range or short-range data network for network communications. For instance, wireless data network 107 may include one or more of a Fourth Generation ("4G"), Long Term Evolution ("LTE"), Fifth Generation ("5G"), WiFi, Bluetooth, and/or another network.

Figure 2:
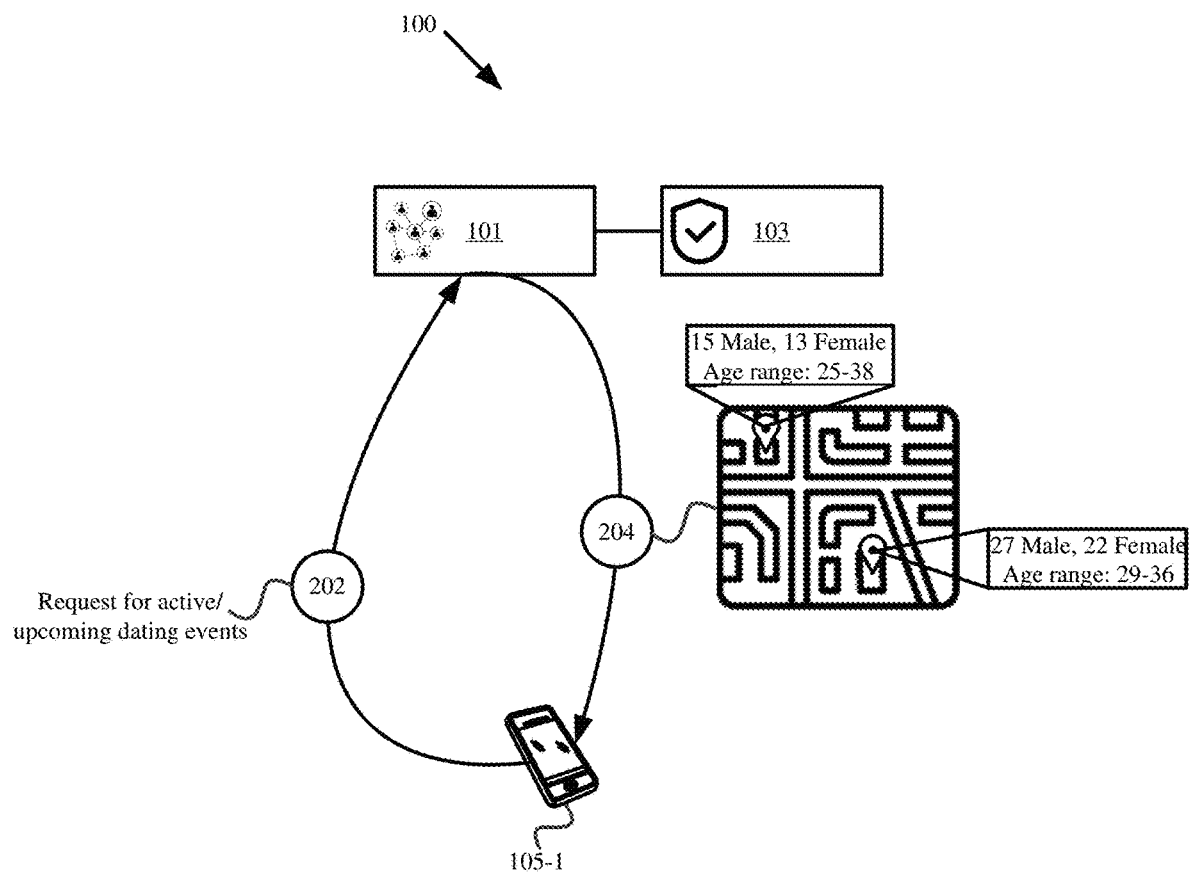
FIG. 2 illustrates an example of the dating platform promoting user engagement while protecting user privacy and safety in accordance with some embodiments presented herein.

FIG. 2 illustrates an example of dating platform 100 promoting user engagement while protecting user privacy and safety in accordance with some embodiments presented herein. As shown in FIG. 2, first user device 105-1 may query (at 202) controller 101 for dating and/or socializing events that are hosted by dating platform 100.

In response to the query, controller 101 may provide (at 204) first user device 105-1 information about active events and/or the location and time of future events. In some embodiments, controller 101 may promote user engagement at an event by tracking dating platform users that are at the event, by tracking dating platform users that have confirmed or otherwise accepted an invitation to the invention, and/or by providing (at 204) aggregate information about the participating users (e.g., users at the event and/or users that have accepted an invitation to the event) without disclosing any private or public information about any individual user. As shown in FIG. 1, controller 101 may provide (at 204) first user device 105-1 with a total number of users at each event, a number of users that have accepted an invitation to each event, the ratio of males to females from the participating users, and/or the age range of the participating users.

In some embodiments, controller 101 may compile the aggregate information from user devices 105 that have performed a checked-in with controller 101 when located at the event, and/or from user devices 105 that have accepted an invitation to the event. In particular, the check-in or invitation acceptance may provide controller 101 with a unique identifier of the registered user that is associated with user device 105 sending the check-in or invitation acceptance message to controller 101. Controller 101 may identify the sex, age, and/or other non-identifying information about the user that is identified by the unique identifier, and may aggregate the data with other user data to generate the user engagement statistics for each event.

In some other embodiments, controller 101 may dynamically identify active events, that may not be hosted or created by dating platform 100, based on a certain number of registered users congregating at a particular location (e.g., a restaurant, bar, venue, etc.). In some such embodiments, controller 101 may track the location of registered user devices 105 in order to determine if a threshold number of users are at a particular location, and may provide (at 204) first user device 105-1 the event participation information in response to detecting at least the threshold number of users at the particular location. Once again, user privacy is protected as the event participation information does not include any individual user information. Specifically, images or profile information of the individual users may not be provided (at 204) with the event participation information to first user device 105-1.

In this manner, controller 101 may promote an event while preserving user safety and user privacy as the user of first user device 105-1 has no knowledge of which specific users will or are attending an event. The user would have to attend the event in-person and perform a check-in at the event in order to identify and/or interact with the other event participants.

Figure 3:
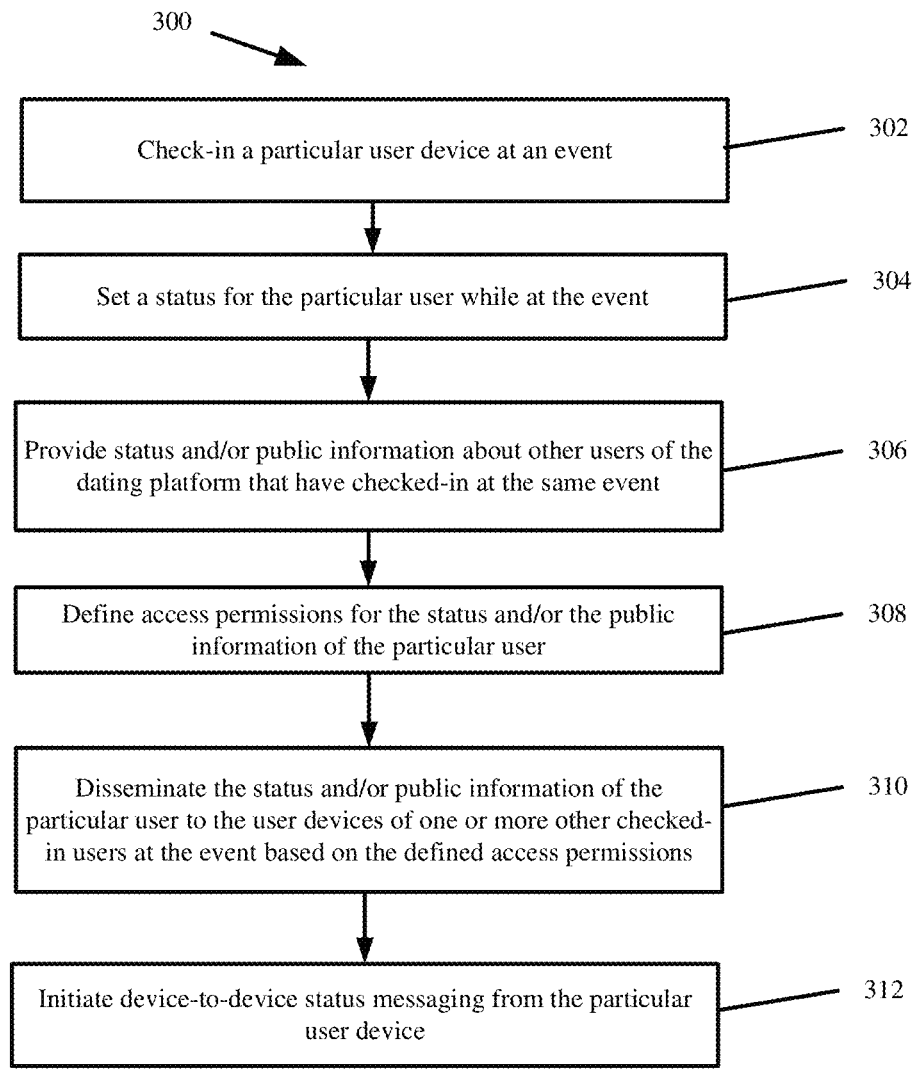
FIG. 3 presents a process for promoting direct user-to-user engagement at an event while continuing to protect user privacy and user safety in accordance with embodiments presented herein.

FIG. 3 presents a process 300 for promoting direct user-to-user engagement at an event while continuing to protect user privacy and user safety in accordance with embodiments presented herein. Process 300 may be performed by controller 101 using remote access to services of different user devices.

Process 300 may include checking-in (at 302) a particular user device at the event. Checking-in the particular user device may include a particular user opening the dating platform application on the particular user device upon arriving at the event, and invoking the check-in operation within the dating platform application. In response to invoking the check-in operation, the particular user device may determine its location via one or more location sensors or services of the particular user device, and may issue a check-in message with the unique identifier of the particular user and the particular user device location to controller 101. In some embodiments, the unique identifier may include user account login credentials. In some other embodiments, the unique identifier may include a hashed value or other value that directly identifiers the particular user, account, and/or profile of the particular user. Controller 101 may map the location information from the check-in message to a location of the active event, and may add the particular user to a list of checked-in user at the event.

Process 300 may include setting (at 304) a status for the particular user while at the event. In some embodiments, the particular user selects the status as part of checking-in (at 302) to the event. Setting (at 304) the status may include selecting an interaction preference for the particular user at the event. For instance, the particular user may select between "single," "networking," "do not disturb," "ready to mingle," "night out with the boys/girls," and/or other status that convey different preferences or intent for attending the event.

In response to the particular user device checking-in at the event and/or setting (at 304) his/her status, process 300 may include providing (at 306) status and/or public information about other users of dating platform 100 that have checked-in at the same event. In providing (at 306) the status and/or public information about the other checked-in user, dating platform 100 continues to protect user privacy and safety by withholding the exact location and the contact information of the other checked-in users. For instance, controller 101 may provide (at 306) the particular user device with images and/or preferences (e.g., gender, age, height, weight, and/or other desired qualities) of the other checked-in users and/or a status to indicate which of the other users are "single," "networking," "do not disturb," "ready to mingle," "night out with the boys/girls," and/or have other status.

In some embodiments, controller 101 may filter the public information that is provided (at 306) based on preferences of the particular user and/or preferences of the other checked-in users. For instance, the particular user may indicate a preference for a particular sex and users that have checked-in with a status of "single", "looking to meet someone new", or the like. In this instance, controller 101 may provide (at 306) the particular user device with the public information of the checked-in users that meet those preferences. The user preferences may be defined in the profile of each user, and controller 101 may match the preferences of the particular user to the preferences of the other check-in users to provide (at 306) the public information for a subset of check-in users that match the preferences of the particular user.

In some embodiments, controller 101 may automatically filter the public information that is provided (at 306) based on the status of the particular user. For example, if the particular user sets a status of "single", then controller 101 may provide (at 306) the particular user device with the public information for all other checked-in users with a status of "single". Continuing with the example, controller 101 may withhold the public information of other checked-in users with a status of "do not disturb" or "night out with the boys/girls" from the particular user.

In some embodiments, controller 101 may provide (at 306) the public information for a specific checked-in user after the particular user completes a questionnaire that is defined by that specific checked-in user, and/or if the provided answers satisfy criteria set by the specific checked-in user. The filtering of the public information enhances dating platform's 100 protections around user privacy and user safety.

Process 300 may include defining (at 308) access permissions for the status and/or the public information of the particular user. For instance, the particular user may prefer his/her status and/or public information to be public and accessible by any other user that is checked-in and present at the event. Alternatively, the particular user may prefer his/her status and/or public information to be public and/or accessible to a select subset of checked-in users for privacy reasons. For instance, the particular user may not want to potentially interact with or potentially be approached by all checked-in users, and may want to limit engagement to no more than 10 checked-in users for a particular period of time. Accordingly, the particular user may select, using the dating platform application, a subset of checked-in users that are provided with the status and/or public information of the particular user. Other checked-in users not in the selected subset of checked-in user may not be presented with the status and/or public information of the particular user. For instance, in response to controller 101 providing (at 304) the public information about the other checked-in users to the particular user device, the dating platform application running on the particular user device may present a picture and/or other public information about the other checked-in user, and the particular user may select the subset of checked-in users that may view the status of the particular user. Controller 101 may then enforce the selection by providing the status and/or public information of the particular user to the other checked-in users according to the defined (at 308) access permissions. Should the particular user be unhappy with the engagement from the selected subset of checked-in users or not receive enough engagement, the particular user may change the access permissions and expose his/her status to a different group of checked-in users.

In some embodiments, defining (at 308) the access permissions may include defining a questionnaire. The questionnaire may include a set of questions and corresponding answers with which controller 101 may restrict which checked-in users may access the status and/or public information of the particular user. For instance, the questionnaire may include questions about preferences, characteristics, interests, and/or other user traits. Based on the answers provided by a responding user, controller 101 may present different status and/or public information for the particular user. Specifically, if the answers from the responding user do not satisfy questionnaire criteria for a match, controller 101 may identify the particular user with "do not disturb" status to the responding user. However, if the answers from the responding user satisfy the questionnaire criteria for a match, controller 101 may identify the particular user with "single" or "ready to mingle" status to the responding user.

Controller 101 may filter the profile information that is presented to the particular user device based on the user preferences and/or selections, and/or may enforce the access permissions defined by the user. At any time, however, the user may update the preferences, selections, and/or access permissions to receive public information about a different set of checked-in users. To promote user engagement, controller 101 may provide the particular user device notifications of new users that have checked-in since a prior filtering and/or selection by the user. For instance, controller 101 may provide messages to the particular user device that pop-up small profile images of the new checked-in users on the particular user device. Alternatively, controller 101 may reorder the list of checked-in users to present the new checked-in users at the top of the list the next time the list is opened on the particular user device. The user may then modify selections, criteria, and/or preferences for users that he/she wants to engage with based on the reordered list.

Process 300 may include disseminating (at 310) the status and/or public information of the particular user to the user devices of one or more other checked-in users at the event based on the defined (at 308) access permissions. Controller 101 may issue one or more wireless messages to the user devices of the other checked-in users so that they are made aware of the particular user's status and/or have access to a picture and/or other public profile information of the particular user.

Process 300 may include initiating (at 312) device-to-device status messaging from the particular user device. The device-to-device status messaging may be used to provide a peer-to-peer distribution of user status between checked-in user device at an event, and/or to provide an augmented reality presentation of the user status. The augmented reality presentation of the user status may overlay a live feed from the camera of the particular user device with the correct and/or filtered status of other checked-in users over those users as they appear in the camera feed. In this manner, the particular user may readily determine who at the event is seeking engagement and/or might be a good match for particular user, and who at the event is not seeking engagement and/or might be a bad match for the particular without exposing private information of any individual user or compromising the safety of any user.

Initiating (at 312) the device-to-device status messaging may include controller 101 sending a message to the dating platform application on the particular user's device. The message may cause the particular user device to periodically broadcast (e.g., every 5 seconds) the status of the particular user from a short-range radio of the particular user device. The short-range radio of the particular user device may correspond to a Bluetooth radio or a WiFi radio. Consequently, user devices of other checked-in users that are physically located at the same event as the particular user device may receive the device-to-device status messaging issued by the particular user device, and the particular user device may receive the device-to-device status messaging from the other user devices.

Dating platform 100 may use the device-to-device status messages for peer-to-peer detection of user device locations, and/or to promote user engagement by providing the augmented reality presentation of status for the checked-in users based on the peer-to-peer discovery of the user device locations. In some embodiments, each device-to-device status message may include a unique identifier for the checked-in user that is to be identified by that status message, the status of that checked-in user, whether the checked-in user has matched with another user, location information (e.g., GPS coordinates), and/or other data. Upon receiving a status message from a sending user device, the dating platform application on the receiving user device may measure the signal strength, signal direction, angle-of-incidence, and/or other signal characteristics and/or may use the location information provided in the status message to determine a relative position of the sending user device to the receiving user device. The relative position may include one or more of the distance, direction, and/or positional information of the sending user device.

The dating platform application may combine the determined location information for each sending user device and/or the status for the checked-in user of each sending user device with a live feed from a user device camera to produce an augmented reality presentation that overlays the live feed with the status of the checked-in users. In particular, the dating platform application may present a visual status indicator over or on checked-in users that appear in the live feed to identify their status.

In some embodiments, enabling (at 312) the device-to-device status messaging may include the user device of each checked-in user establishing network connections with other user devices of other checked-in users at the same event. Accordingly, the user devices may create a peer-to-peer mesh network by which each user device may track the signal strength, signal direction, and/or other signaling characteristics of the other user devices and/or may receive updated location information to map user device positions at the event. In some embodiments, the user devices may temporarily pair with one another over Bluetooth for low-power and short-range location tracking.

Figure 4:
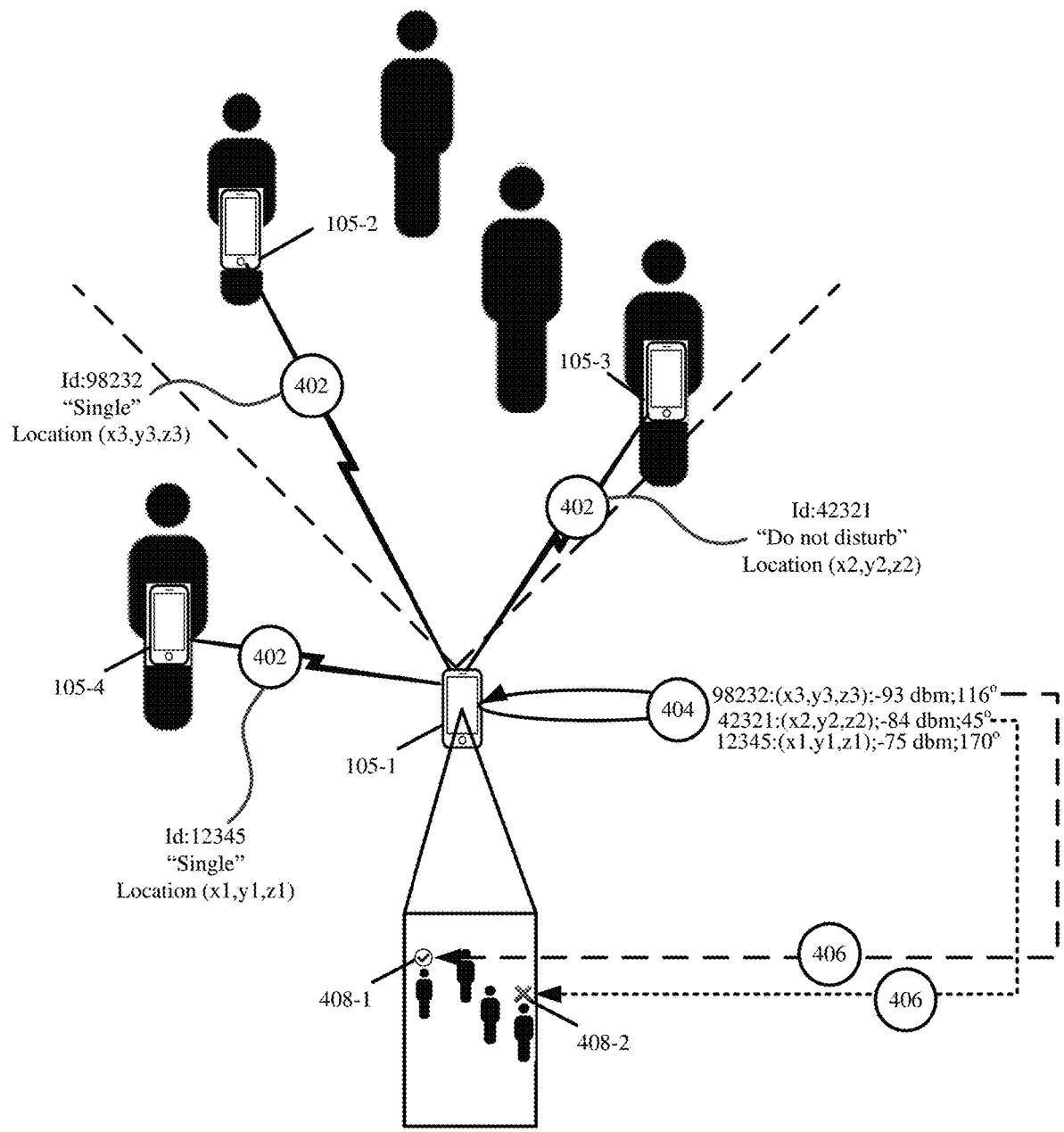
FIG. 4 illustrates an example of an augmented reality user status presentation in accordance with some embodiments presented herein.

FIG. 4 illustrates an example of the augmented reality user status presentation in accordance with some embodiments presented herein. As shown in FIG. 4, first user device 105-1 of a first checked-in user may be held with its camera facing second user device 105-2 of a second checked-in user and third user device 105-3 of a third checked-in user, and with fourth user device 105-4 being positioned out of the field-of-view of the first user device's 105-1 camera.

First user device 105-1 may establish a network connection with second user device 105-2, third user device 105-3, and fourth user device 105-4, and/or may receive (at 402) device-to-device status messages from each of second user device 105-2, third user device 105-3, and fourth user device 105-4. Each device-to-device status message may provide the unique identifier, checked-in status, location, and/or other public information about the user of the user device sending the message.

First user device 105-1 may determine (at 404) the location of second user device 105-2, third user device 105-3, and fourth user device 105-4 based on signaling characteristics of each received status message and/or based on location information (e.g., positional coordinates) provided in each status message. As noted above, signaling characteristics such as signal strength, signal direction, angle-of-incidence, etc. may be used to determine the distance and location of the sending user device relative to the receiving user device.

First user device 105-1 may determine the orientation, direction, and position of the camera, and the coordinates for the area falling within the camera's field-of-view. First user device 105-1 may then determine which if any of the user device locations fall within the camera's field-of-view by mapping the determined (at 404) user device locations to the area that is captured by the camera. First user device 105-1 may present (at 406) the camera feed onscreen with different visual indicators 408-1 and 408-2 at positions in the camera feed that correspond to a determined user device location of a checked-in user. As shown in FIG. 4, first user device 105-1 may present first visual indicator 408-1 above a first user at a position that corresponds to a detected position of second user device 105-2, and second visual indicator 408-2 above a second user at a position that corresponds to a detected position of third user device 105-3.

Each visual indicator 408-1 and 408-2 may present the status of the checked-in user as provided in the status message sent by the user device of that user. In some embodiments, different colors, symbols, and/or text may be used to convey the different status. In some embodiments, the dating platform application may perform some image analysis and/or facial recognition to position visual indicators 408-1 and 408-2 directly over the heads of the checked-in users that are detected in the camera output.

In some embodiments, the same status message sent from a particular sending user device may present different status on different receiving user devices. For instance, if the user of the sending user device is matched to a first user but not a second user based on user preferences, user selection, and/or other criteria, then different status will be shown for the sending user on the user device of the first user than on the user device of the second user. Specifically, the sending user may set a status of "single" for himself, but the status may appear as "do not disturb" on the user device of a first checked-in user if the first checked-in user was not selected by the sending user or is determined not to be match with the sending user because of differences in preferences. Conversely, the status of "single" may appear for the sending user on the user device of a second checked-in user if the second checked-in user was selected by the sending user or is determined to be match with the sending user. In some such embodiments, the different status may be predicated off the unique identifier in the received status message. For instance, a receiving user device may receive a status message, may perform a lookup of the unique identifier included with the status message to determine if the user of the sending device is matched to or has selected the user of the receiving device, and may present status depending on the lookup result.

Similarly, visual indicators 408-1 and 408-2 may be customized based on preferences, selections, and/or other criteria associated with the user of receiving user device 105-1. For instance, user devices 105-2 and 105-3 may each transmit a status of "single" to first user device 105-1. User device 105-1 may provide the identifiers for user devices 105-2 and 105-3 or for the users associated with user devices 105-2 and 105-3 to controller 101. Controller 101 may perform a match query using the identifiers, and may notify first user device 105-1 that the first user of first user device 105-1 has matched with the second user of second user device 105-2 but not with the third user of third user device 105-3. For instance, the first user may have previously selected, swiped right, or otherwise indicated a desire to engage with the second user, and may have previously deselected, swiped left, or otherwise indicated no desire to engage with the third user. The second user may have also previously selected, swiped right, or otherwise indicated a desire to engage with the first user. Accordingly, controller 101 may identify the match between the first user and the second user, and may cause the dating platform application on first user device 105-1 to customize visual indicators 408-1 and 408-2 based on the match. Visual indicator 408-1 may illuminate with a first color (e.g., green) to indicate that the corresponding user has a single status and is also matched with the first user of first user device 105-1, and visual indicator 408-2 may illuminate with a different second color (e.g., yellow) to indicate that the corresponding user has the same single status but has not matched with the first user.

In this manner, the augmented reality presentation may continue to preserve user privacy by withholding private user information while identifying which users are seeking engagement. Safety protocols may also be enforced to safeguard the users. For instance, dating platform 100 may track when a first user ignores the status notifications and engages with a second user that has indicated a preference for no engagement by the first user. In this case, dating platform 100 may suspend or ban the first user from subsequent events, or may notify security personnel at the event to prevent any such status violations.

The signaling characteristics and location information of the status messages may allow the dating platform application to identify the locations of other user devices in dark rooms where image analysis and/or facial recognition of users in the camera feed may be impossible. In some such embodiments, the visual indicators may still be presented onscreen at a relative position or location of a detected user device. In some such embodiments, the dating platform application may enhance the augmented reality presentation by supplementing the feed with public information.

Figure 5:
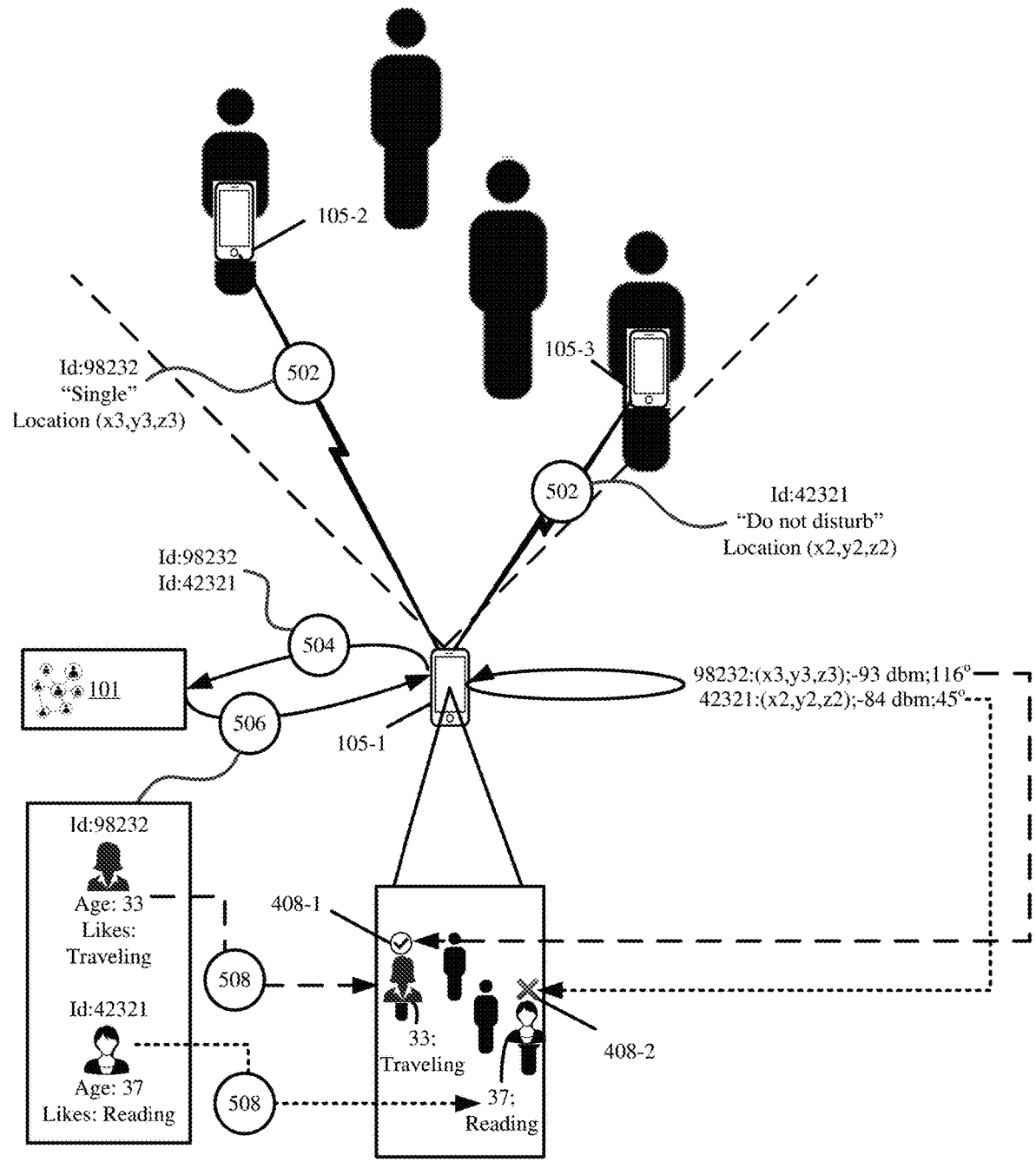
FIG. 5 illustrates an example of supplementing the augmented reality presentation with public profile information in accordance with some embodiments presented herein.

FIG. 5 illustrates an example of supplementing the augmented reality presentation with public profile information in accordance with some embodiments presented herein. As shown in FIG. 5, first user device 105-1 may receive (at 502) the device-to-device status messages from second user device 105-2 and third user device 105-3 that are positioned in the field-of-view of the first user device camera. The status messages may include the unique identifier for each user of second user device 105-2 and third user device 105-3.

First user device 105-1 may query (at 504) controller 101 using the unique identifier for each user of second user device 105-2 and third user device 105-3, and controller 101 may provide (at 506) public profile information for each of the users. The public profile information may include a picture of each user and various preferences of each user. First user device 105-1 may overlay (at 508) the picture and preferences over the detected position of second user device 105-2 and third user device 105-3 in the live camera feed so the user of first user device 105-1 may know what the other checked-in users look like even in a dark or crowded room, and may use the preferences to start conversation with those users.

In some other embodiments, the dating platform application may perform image analysis and/or facial recognition to supplement or replace the location determination based on signaling characteristics and/or location information. For instance, the dating platform application may receive the device-to-device status messages from other user devices, may lookup a profile picture of each checked-in user based on the unique identifier in each status message, may perform image analysis and/or facial recognition to detect different checked-in users in the camera field-of-view, and may present the correct status indicator for those users.

Whereas other online dating services reveal the private user information when two users are matched or express interest in one another via a swipe gesture or other selection that is based on nothing more than a profile picture and/or basic public information that can be easily faked, dating platform 100 may provide users complete control over when and to who their private user information is revealed. More specifically, dating platform 100, via the hosted events, checked-in user status, and/or augmented reality presentation, may match users and may allow direct in-person communication and/or interaction to take place between two users prior to revealing any user private information. In this manner, a user can verify the actual physical appearance of another person, rather than rely on an easily faked or manipulated profile picture, and may determine for themselves whether they are a match (e.g., are engaging or interesting, share common interests, etc.) based on in-person interaction, rather than rely on some carefully curated profile text, before determining to reveal their private information to another.

In some embodiments, dating platform 100 may safeguard user private information by allowing users to disseminate their private information only to other check-in users they have established a "link" with. Users may establish links after having had an in-person or face-to-face interaction, and having placed their phones directly next to one another or in close proximity to one another. In this manner, private user information may not be exposed to a random stranger that a user has never met.

Figure 6:
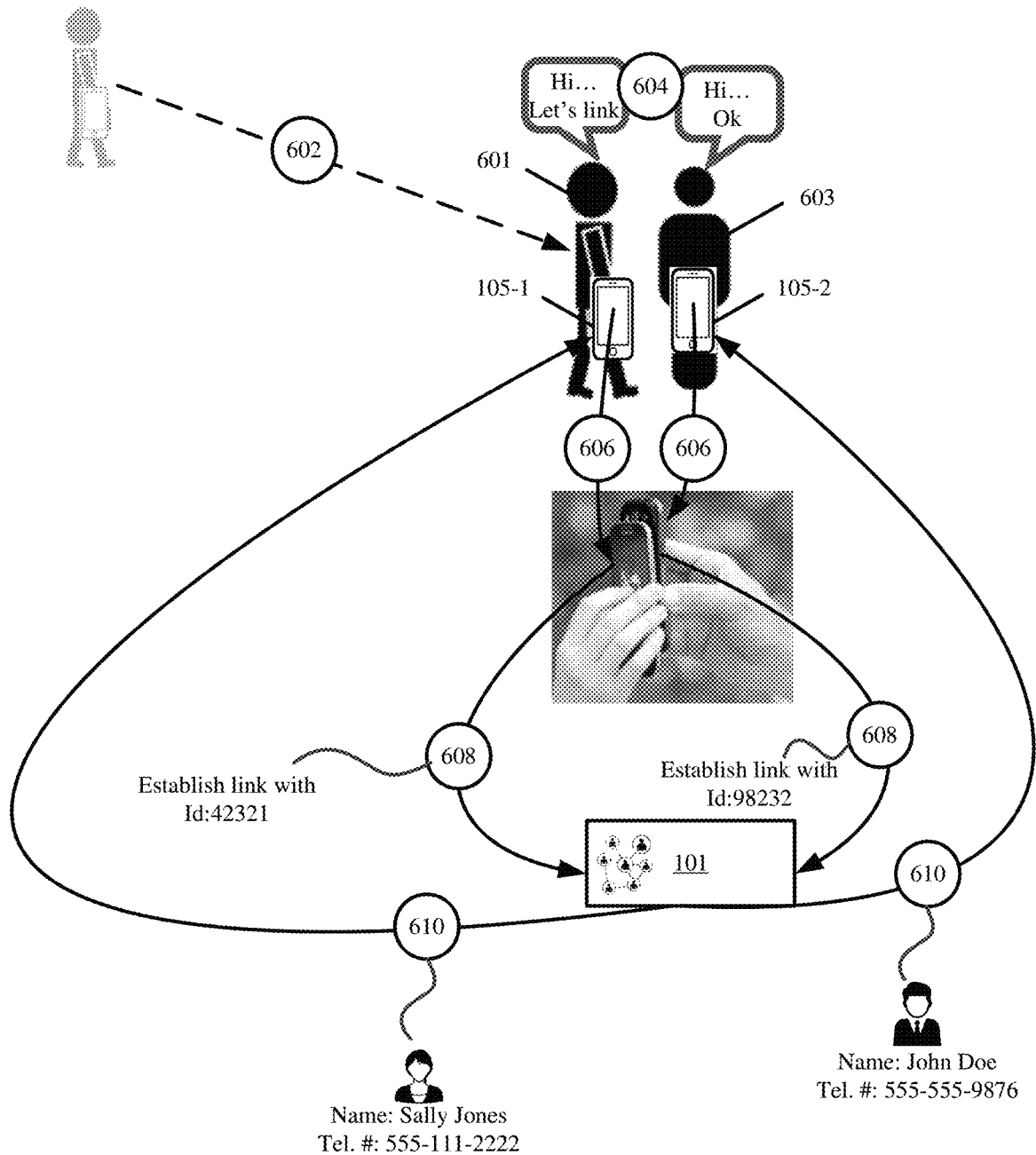
FIG. 6 illustrates an example of the dating platform providing users control over the release of their private user information based on links that are established by the users in accordance with some embodiments presented herein.

FIG. 6 illustrates an example of dating platform 100 providing users control over the release of their private user information based on links that are established by the users in accordance with some embodiments presented herein. As shown in FIG. 6, first user 601 may locate (at 602) second user 603 that has checked-in at an event with a status indicating a desire to engage with a set of users that includes first user 601. First user 601 may locate (at 602) second user 603 using the augmented reality presentation described above. First 601 may directly engage (at 604) with second user 603 by having an in-person discussion at the event.

Should first and second users 601 and 603 express a mutual interest in one another and wish to continue building a new relationship, first and second users 601 and 603 may establish (at 606) a link in dating platform 100. To establish (at 606) the link, first user 601 may place or wave his/her first user device 105-1 over second user device 105-2 of second user 603. In other words, establishing (at 606) the link may require side-by-side or placing devices 105-1 and 105-2 in close proximity with one another (e.g., less than 6 inches from one another).

Near-Field Communication ("NFC") or another extremely short-range form of communication may be triggered between the devices when the devices touch or are placed in close proximity with another. The devices may exchange wireless messaging that includes the unique identifier of each user, and the messaging may establish (at 608) the link between the two users at controller 101.

Each user device may separately confirm the establishment of the link by providing (at 608) link establishment messaging to controller 101. In response to controller 101 receiving the link establishment messaging from each user device, controller 101 may store the link, and may provide (at 610) private user information from each user's profile to the user device of the other user. For instance, controller 101 may provide (at 610) the telephone number, email, name, and/or other private information from the user profile of first user 601 to second user device 105-2 of second user 603 that has established a link with first user 601, and may provide (at 610) the telephone number, email, name, and/or other private information from the user profile of second user 603 to first user device 105-1 of first user 601 that has established a link with second user 603. First user 601 may then continue the conversation with second user 603 at a later time or may be continue the current conversation without having to pause the conversation to enter the contact information in their device.

In some embodiments, first user device 105-1 and second user device 105-2 may exchange device-to-device messaging when the user devices are detected to be in close proximity to one another (e.g., less than 1 foot), the device-to-device messaging may present an option on first user device 105-1 and second user device 105-2 for linking first user 601 to second user 603. Each user may then a confirmation button or perform a confirmation gesture to complete the link establishment.

In addition to controlling the exchange of private user information, dating platform 100 may use the established links to safeguard its users. In some embodiments, users may set different safety protocols for dating platform 100 to enforce on their behalf. Dating platform 100 may monitor the interactions between linked users based on the selected safety protocols, and may perform different actions to verify user safety and/or respond when a user is detected to be in danger.

Figure 7:
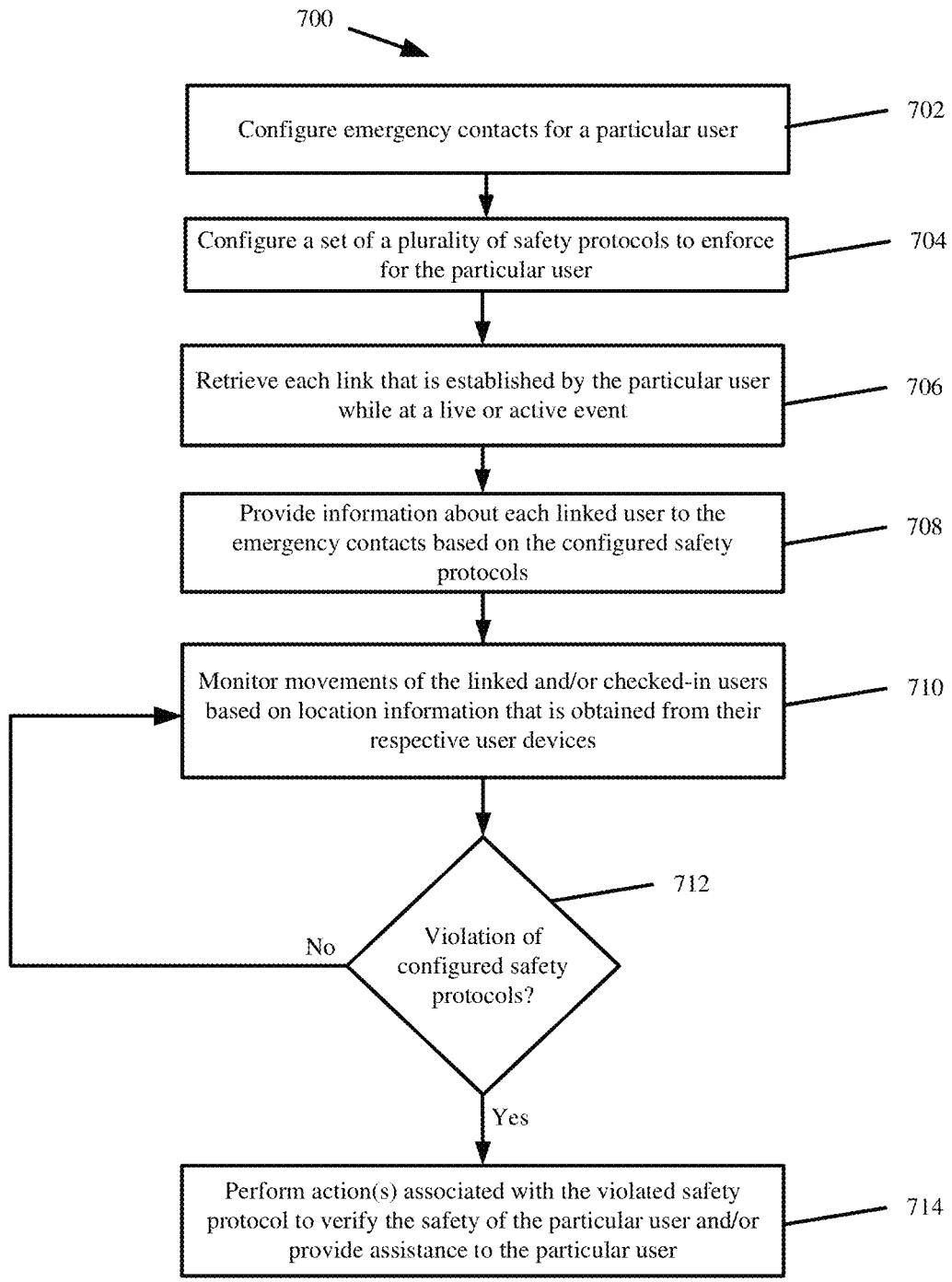
FIG. 7 presents a process for safeguarding users of the dating platform in accordance with some embodiments presented herein.

FIG. 7 presents a process 700 for safeguarding users of dating platform 100 in accordance with some embodiments presented herein. Process 700 may be implemented by safeguard system 103 of dating platform 100. Safeguard system 103 may be configured with a plurality of safety protocols and/or rules, may access the established links between different checked-in users at an event from controller 101, and/or may enforce different sets of safety protocols for different linked users.

Process 700 may include configuring (at 702) one or more emergency contacts for a particular user that is checked-in at an event. In some embodiments, the user device of the particular user may provide safeguard system 103 with contact information for the one or more emergency contacts when checking-in the particular user at an event. In some other embodiments, a group of users may perform a collective check-in, and one or more users in the group of users may be designated as an emergency contact for the group. An emergency contact may include a designated driver, a friend, and/or someone who is not present at the event (e.g., a parent).

Process 700 may include configuring (at 704) a set of a plurality of safety protocols to enforce for the particular user while at the event and after leaving the event. Some users may prefer dating platform 100 to take action at a first sign of danger, and other user may prefer dating platform 100 to take action only in extreme situations.

The safety protocols may specify conditions at which user safety may be at risk, and actions that dating platform 100 may perform to verify user safety and/or provide assistance when user safety is determined to be at risk. For instance, a first safety protocol may include a condition that is triggered when a particular user is detected to have left the location of an active event without being accompanied by one or more other users that checked-in with the particular user, leaving the event with another user that established a link with the particular user at the event, leaving the event without another user that is a designated driver for the particular user, and/or leaving the event with another user that the particular user placed on a do not disturb or engage with list. A second safety protocol may include a condition that is triggered when the particular user does not provide updated status or perform a new check-in on an hourly basis. A third safety protocol may include a condition that is triggered when an emergency contact attempts to contact the particular user and the particular user is unresponsive, or when the particular user attempts to the contact an emergency contact and the emergency contact does not respond within a specified period of time.

Process 700 may include retrieving (at 706) each link that is established by the particular user while at the event (e.g., a live or active event). Process 700 may include providing (at 708) information about each linked user to the emergency contacts based on the configured (at 704) safety protocols. This allows the emergency contacts to keep track of the particular user's activity, who they are with at what time, and/or monitor the particular user in case of any danger detected by the emergency contacts. In some embodiments, the safety protocols may include keeping the linked user information from the emergency contacts until there is a detected safety protocol violation for privacy reasons.

Process 700 may include monitoring (at 710) movements of the linked and/or checked-in users based on location information that is obtained from their respective user devices. Process 700 may include determining (at 712) if any configured safety protocols are violated based on the monitored (at 710) movements.

In response to determining (at 712—No) that none of configured safety protocols for the particular user have been violated by the particular user, process 700 may continue monitoring (at 710) movements of linked and/or checked-in users until the event they attended ends or some amount of time has passed since the event occurred. For instance, safeguard system 103 may safeguard the users up to the day after the event.

In response to determining (at 712—Yes) that a configured safety protocol for the particular user has been violated, process 700 may perform (at 714) one or more actions associated with the violated safety protocol to verify the safety of the particular user and/or provide assistance to the particular user. Performing (at 714) the one or more actions may include notifying and/or alerting the one or more emergency contacts of the particular user that violates a safety protocol, security personnel at the event, police, the user device of the particular user, the user device of users that are linked with the particular user at the event, and/or others. The notifications and/or alerts may include providing location information for the user device of the particular user and/or the linked user that is detected to have left with the particular user.

For instance, safeguard system 103 may detect, based on user device location tracking, the particular user checking-in to an event with a particular group, leaving the event before any other users in the particular group, and/or without the particular user providing any messaging via the dating platform application that confirms his/her intent to leave the event. Such a scenario may indicate the that the particular user has become intoxicated, ill, or unable to think or act clearly. Provided that these conditions violate a safety protocol, safeguard system 103 may retrieve the emergency contact for the particular user, may call, message, and/or provide other notification to the emergency contact that describes the safety protocol violation, and may provide real-time location information of the particular user to the emergency contact.

In another scenario, safeguard system 103 may detect the particular user leaving an event with another user that the particular user established a link with at the event. Dating platform 100 may further track the movements of the users to a residence (e.g., a non-public location). Dating platform 100 may provide a notification to the user device of the particular user and/or the linked user to request if the engagement is with consent. If a user responds that they are in danger or does not respond within a specified amount of time, dating platform 100 may notify the emergency contacts and/or authorities for assistance.

Dating platform 100 may use the safety protocols to ensure that an intoxicated or impaired user remains safe and is not taken advantage of, and/or to ensure that a linked user does not act inappropriately or forcefully against another user. In some embodiments, safeguard system 103 may enforce the safety protocols upon users checking-in to an event and prior to links being established by the users. In some such embodiments, safeguard system 103 may verify whether the users adhere to the status of other users. For instance, safeguard system 103 may verify that a user that has set a status to "do not disturb" is not approached by other checked-in users. Similarly, a first user may engage with a second user. The second user may not be interested in the first user, and may not wish to be further engaged by the first user. Accordingly, the second user may set a "not interested" status for the first user, and safeguard system 103 may monitor the positioning of the users to determine if the first user continues to approach and/or engage the second user. Noncompliance with the set user status and/or continued engagement after the "not interested" status is set may violate a safety protocol. In response, safeguard system 103 may notify the first user via his/her user device that the first user's behavior has become harassing and to avoid further contact with the second user, may notify security personnel at the event to assist, and/or may suspend or ban the first user from dating platform 100 for violating the safety protocols.

In some embodiments, dating platform 100 may connect with the establishment or business that provides the venue for a dating platform event in order to provide cross-promotions between the establishment/business and dating platform 100. For instance, dating platform 100 may host a dating event at a bar, and may drive verifiable business to the bar. In return, the bar may provide the dating platform users with promotions (e.g., discounts, prizes, etc.), and/or may provide dating platform 100 with revenue sharing. Specifically, upon each user checking-in to the event, dating platform 100 may provide a coupon that the user may use to redeem free or discounted food or drink from the bar. Similarly, based on the number of user check-ins, dating platform 100 may track and verify the number of dating platform users that arrived at the bar. The bar may then provide financial compensation to dating platform 100 once the number of dating platform users exceeds a threshold value.

These cross-promotions provide a safe public venue at which dating platform 100 may host events at different cities while providing an incentive for the businesses to allow the events to take place. In some embodiments, the dating platform application may include a rating option by which users may rate the event at a particular venue. For instance, users may provide a high rating for a venue with a large number of checked-in users, and dating platform 100 may use the provided user feedback to determine where and when to host different events.

Figure 8:
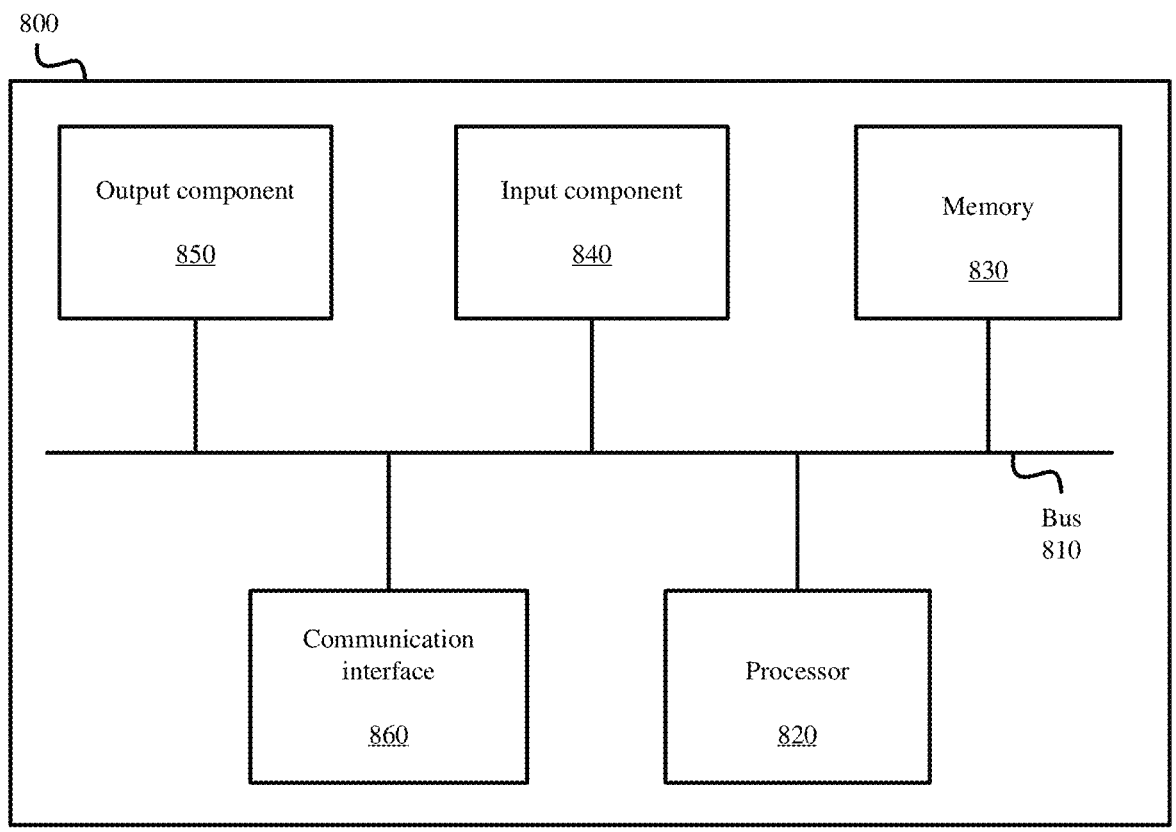
FIG. 8 illustrates example components of one or more devices, according to one or more embodiments described herein.

FIG. 8 is a diagram of example components of device 800. Device 800 may be used to implement one or more of the devices or systems described above (e.g., dating platform 100, controller 101, safeguard system 103, user devices 105, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
performing a check-in of a first user at a particular event with a first user device of the first user;
receiving, at the first user device in response to performing the check-in, a plurality of messages from a plurality of user devices of a plurality of users at the particular event that have previously checked-in to the particular event, wherein each message of the plurality of messages comprises a status for a different user of the plurality of users at the particular event;
determining a location of each of the plurality of user devices based on signaling characteristics associated with receiving each message of the plurality of messages;
capturing a continuous live feed of an area falling within a field-of-view of a camera of the first user device; and
providing an augmented reality presentation on a display of the first user device, wherein providing the augmented reality presentation comprises presenting the continuous live feed from the camera on the display and a visual indicator corresponding to the status of a second user of the plurality of users over a continuously updated image of the second user in the continuous live feed presented on the display.

2. The method of claim 1 further comprising:
receiving, at the first user device, public information from profiles of the plurality of users in response to performing the check-in, wherein the public information comprises at least one of a picture, descriptive characteristics, or preferences of a particular user from the plurality of users, and wherein the public information excludes private information comprising contact information of the particular user.

3. The method of claim 2, wherein receiving the public information comprises:
setting a particular status from a plurality of different status for the first user; and
presenting the public information from profiles of a first set of the plurality of users having the particular status set in common with the first user, and wherein presenting the public information comprises withholding the public information from profiles of a different second set of the plurality of users having a different status than the particular status set for the first user.

4. The method of claim 2 further comprising:
selecting a first set of the plurality of users to engage with and a different second set of the plurality of users not to engage with based on the public information;
providing a first status for the first user from the first user device to a first set of the plurality of user devices of the first set of users; and
providing a different second status for the first user from the first user device to a different second set of the plurality of user devices of the second set of users.

5. The method of claim 2 further comprising:
updating the visual indicator in the augmented reality presentation to present one or more of the picture, descriptive characteristics, or preferences of the second user from the public information of the second user.

6. The method of claim 2 further comprising:
detecting the second user device touching or coming within a specific close distance of the first user device;
establishing a link between the first user and the second user of the second user device in response to said detecting; and
providing private information from the profile of the first user to the second user device and private information from the profile of the second user to the first user device in response to establishing the link, wherein the private information comprises the contact information of the first user or the second user.

7. The method of claim 1 further comprising:
tracking movements of the first user device and a second user device of the second user; and
detecting the first user device exiting the particular event with the second user device.

8. The method of claim 7 further comprising:
determining that the first user device exiting with the second user device violates a configured safety protocol; and
requesting confirmation as to safety of the first user or the second user from at least one of the first user and the second user.

9. The method of claim 7 further comprising:
identifying an emergency contact for the first user in response to the first user device exiting the particular event with the second user device; and providing the emergency contact with a location of at least one of the first user and the second user.

10. The method of claim 1 further comprising:
configuring an emergency contact and safety protocols for the first user;
tracking a location of the first user using location services of the first user device; and
alerting the emergency contact in response to detecting a violation of one of the safety protocols based on said tracking.

11. The method of claim 1 further comprising:
determining that the first user has engaged a third user of the plurality of users with a status set to do not disturb; and
alerting one of the first user or security for the particular event of a safety violation in response to said determining.

12. The method of claim 1, wherein performing the check-in comprises:
checking-in the first user with a particular group of users; and
configuring a safety protocol with a condition for the first user to leave the particular event with at least one user from the particular group of users.

13. The method of claim 12 further comprising:
tracking a location for each of the first user and each user of the particular group of users based on signaling from the first user device and a user device of each user in the particular group of users;
detecting that the first user leaves the particular event alone or with another user not in the particular group of users based on said tracking; and
safeguarding the first user by notifying at least one user in the particular group of users of the first user leaving the particular event.

14. The method of claim 13 further comprising:
contacting police in response to the first user or the at least one user in the particular group of users failing to verify safety of the first user after a specified amount of time.

15. A platform comprising:
a controller promoting safe and secure user engagement at a particular event; and
a plurality of user devices for a plurality of users participating in the particular event, wherein the plurality of user devices comprises a first user device of a first user with a camera, a display, and one or more processors configured to:
perform a check-in of a first user at the particular event with the controller;
receive a plurality of messages from the plurality of user devices that have previously checked-in to the particular event in response to performing the check-in, wherein each message of the plurality of messages comprises a status for a different user of the plurality of users at the particular event;
determine a location of each of the plurality of user devices based on signaling characteristics associated with receiving each message of the plurality of messages;
capture a continuous live feed of an area falling within a field-of-view of the camera; and
providing an augmented reality presentation on the display, wherein providing the augmented reality presentation comprises presenting the continuous live feed from the camera on the display and a visual indicator corresponding to the status of a second user of the plurality of users over a continuously updated image of the second user in the continuous live feed presented on the display.

16. The platform of claim 15, wherein one or more processors are further configured to:
receive public information from profiles of the plurality of users in response to performing the check-in, wherein the public information comprises at least one of a picture, descriptive characteristics, or preferences of a particular user from the plurality of users, and wherein the public information excludes private information comprising contact information of the particular user.

17. The platform of claim 16, wherein receiving the public information comprises:
setting a particular status from a plurality of different status for a first user; and
presenting the public information from profiles of a first set of the plurality of users having the particular status set in common with the first user, and wherein presenting the public information comprises withholding the public information from profiles of a different second set of the plurality of users having a different status than the particular status set for the first user.

18. The platform of claim 16, wherein the one or more processors are further configured to:
select a first set of the plurality of users to engage with and a different second set of the plurality of users not to engage with based on the public information;
provide a first status for the first user from the first user device to a first set of the plurality of user devices of the first set of users; and
provide a different second status for the first user from the first user device to a different second set of the plurality of user devices of the second set of users.

19. The platform of claim 16,
wherein the one or more processors are further configured to detect the second user device touching or coming within a specific close distance of the first user device; and
wherein the controller is configured to:
establish a link between the first user and the second user of the second user device in response to said detecting; and
provide private information from the profile of the first user to the second user device and private information from the profile of the second user to the first user device in response to establishing the link, wherein the private information comprises the contact information of the first user or the second user.

20. A non-transitory computer-readable medium, storing a plurality of processor-executable instructions to:
perform a check-in of a first user at a particular event with a first user device of the first user;
receive a plurality of messages from a plurality of user devices of a plurality of users at the particular event that have previously checked-in to the particular event in response to performing the check-in with the first user device, wherein each message of the plurality of messages comprises a status for a different user of the plurality of users at the particular event;
determine a location of each of the plurality of user devices based on signaling characteristics associated with receiving each message of the plurality of messages;
capture a continuous live feed of an area falling within a field-of-view of a camera of the first user device; and
provide an augmented reality presentation on a display of the first user device, wherein providing the augmented reality presentation comprises presenting the continuous live feed from the camera on the display and a visual indicator corresponding to the status of a second user of the plurality of users over a continuously updated image of the second user in the continuous live feed presented on the display.

* * * * *